(12) United States Patent
Knepper et al.

(10) Patent No.: US 12,007,029 B2
(45) Date of Patent: Jun. 11, 2024

(54) COMPONENT ASSEMBLY FOR A MOTOR VEHICLE

(71) Applicant: Robert Bosch GmbH, Stuttgart (DE)

(72) Inventors: Markus Knepper, Kornwestheim (DE); Ralph Glemser, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 754 days.

(21) Appl. No.: 17/149,286

(22) Filed: Jan. 14, 2021

(65) Prior Publication Data
US 2021/0222775 A1  Jul. 22, 2021

(30) Foreign Application Priority Data
Jan. 17, 2020  (DE) ............... 10 2020 200 556.7

(51) Int. Cl.
*F16J 15/3208* (2016.01)
*F16J 15/3236* (2016.01)

(52) U.S. Cl.
CPC ....... *F16J 15/3236* (2013.01); *F16J 15/3208* (2013.01)

(58) Field of Classification Search
CPC .. F16J 15/3236; F16J 15/3208; F16J 15/3232; F16J 15/3216; F16J 15/3204
See application file for complete search history.

(56) References Cited

FOREIGN PATENT DOCUMENTS

| | | |
|---|---|---|
| CN | 108757187 A | 11/2018 |
| DE | 10 2017 119 958 A1 | 3/2018 |
| DE | 10 2018 103 720 A1 | 8/2018 |
| DE | 102017129027 A1 * | 6/2019 ............. F04C 29/00 |
| EP | 2 213 916 A1 | 8/2010 |
| EP | 2239474 A1 * | 10/2010 .......... F16C 33/7879 |
| FR | 2927395 A3 * | 8/2009 .......... F16H 57/029 |
| WO | 2008/144686 A1 | 11/2008 |

* cited by examiner

Primary Examiner — Gilbert Y Lee
(74) Attorney, Agent, or Firm — Maginot, Moore & Beck LLP

(57) ABSTRACT

A component assembly for a motor vehicle includes a housing and an actuating element that is rotatable about an axis. The assembly also includes an actuator which is configured to cause rotation of the actuating element. The assembly further includes a rotatable shaft which extends along a shaft axis and is disposed between the actuating element and the actuator and which is coupled to the actuating element and the actuator. The shaft is guided through a first through opening in the housing. A sealing system which seals a first end of the first through opening in relation to a second end, facing away from the first end, of the first through opening against liquid media passing through is provided in a radial direction that is perpendicular to the shaft axis so as to be between the shaft and a first internal wall of the first through opening. The sealing system has a first sealing element having a second through opening through which the shaft is guided. The first sealing element has a radially inward-pointing first internal side as well as a radially outward-pointing first external side. The first sealing element by way of the first internal side in a sealing manner encircles a shaft external side of the shaft. A first material of the first sealing element largely comprises polytetrafluoroethylene (PTFE).

22 Claims, 4 Drawing Sheets

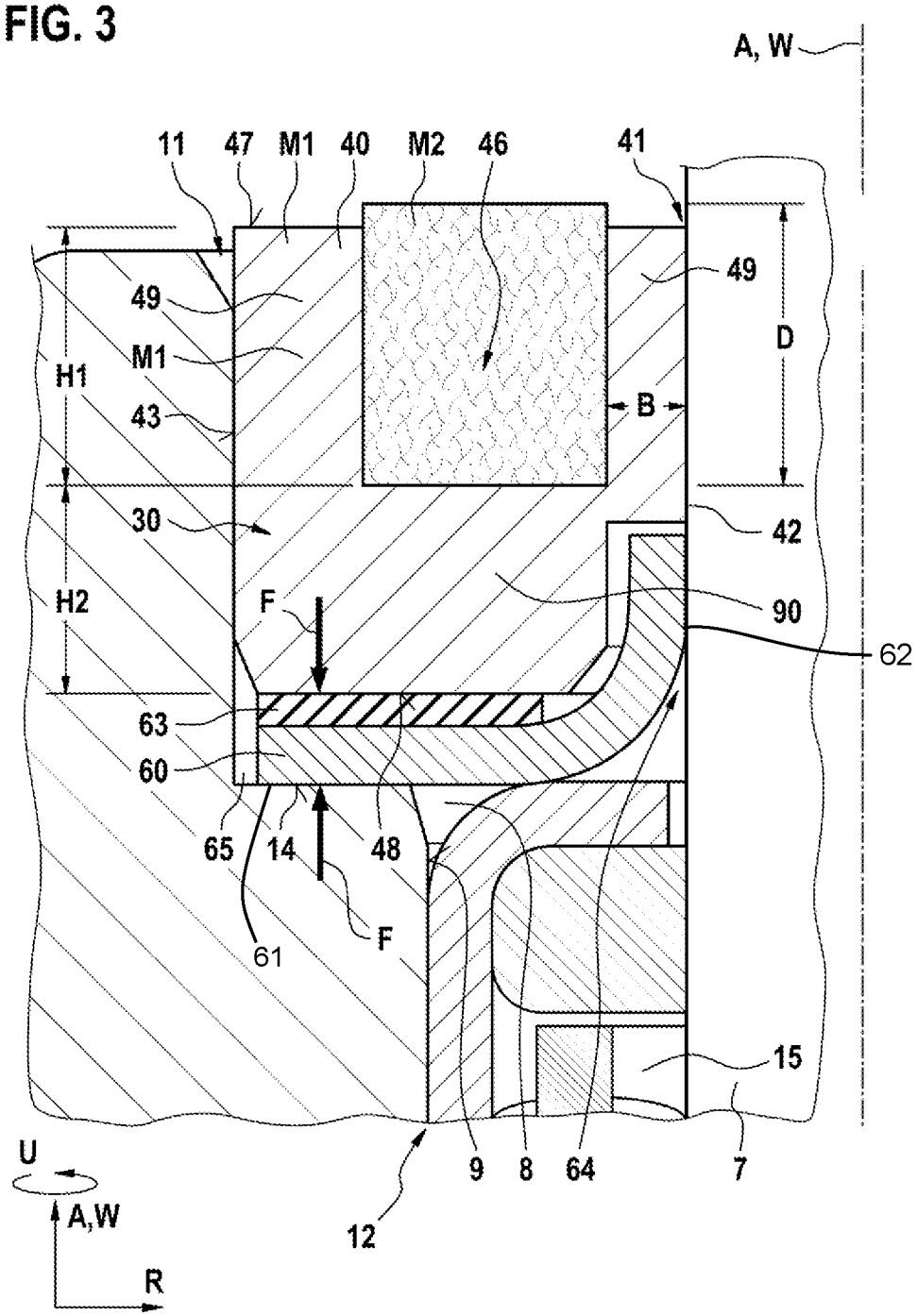

COMPONENT ASSEMBLY FOR A MOTOR VEHICLE

This application claims priority under 35 U.S.C. § 119 to patent application no. DE 10 2020 200 556.7, filed on Jan. 17, 2020 in Germany, the disclosure of which is incorporated herein by reference in its entirety.

BACKGROUND

The disclosure relates to a component assembly for a motor vehicle.

Component assemblies for motor vehicles which have an actuator (for example a motor), a shaft, and a, for example rotatable, actuating element that is coupled to the shaft are known from the prior art. The component assembly can be, for example, a throttle flap component assembly or a so-called general-purpose actuator. The actuating element herein can be, for example, a (throttle) flap or a roller which is mounted on a lever and actuates, for example, an air flap in the intake or exhaust duct of a motor vehicle. The actuating element and/or the actuator herein are/is often disposed in a housing. The actuating element and the actuator herein can be spatially separated from one another by a wall of the housing. The shaft herein penetrates a through opening in the wall, for example. A sealing system which is to prevent or minimize the passage of, for example, water from one side of the wall to the other side of the wall can be provided in the through opening.

Such a component assembly is known from DE 10 2018 103 720 A1.

SUMMARY

The disclosure proceeds from the concept that component assemblies of this type can be heavily exposed to liquid and/or gaseous media, for example. Under moist or wet road conditions, for example, the component assemblies can thus be exposed to permanent spraying by contaminated water which splashes from the tires up to the component assembly, for example. This requires a high complexity in terms of ensuring the tightness of the component assembly.

Component assemblies of this type can furthermore be used in the proximity of hot surfaces. Great temperature changes, for example in the range from −40° C. to 170° C., can arise here. These temperature changes set further high requirements in terms of the sealing by way of which the shaft in the through opening is to be sealed. It has been demonstrated that it can be difficult to ensure the tightness in the entire temperature range by virtue of the expansion of the material.

At the same time, severely heavier corrosion can arise specifically at the high temperatures of, for example, 160° C. or even 170° C., above all when the fluid media are saline, for example, or when aggressive oils or vapors are contained in the fluid media. Furthermore, not all materials are suitable for sealing the sealing point across the desired temperature range without leakages and brittleness or a change in the elastic properties.

Finally, it is necessary for a long service life to be achieved such that the sealing point is to display ideally little wear even in the case of a multiplicity of movements of the shaft during the service life. It is moreover desirable for as little friction as possible to be generated at the sealing point so as not to have to unnecessary oversize the actuator and to minimize the wear on the sealing system.

Furthermore, a bearing which in an exemplary manner can be provided in the through opening and permits the shaft to rotate with low friction is to be protected as far as possible against particles and dirt. In order for a complex and separate encapsulation of such a bearing to be able to be avoided it is necessary for the seal to ideally also repel or bind (filter) particles that are transported by the fluid media.

There is therefore a potential demand in terms of providing a component assembly for a motor vehicle, the component assembly having a sealing system for a shaft guided through a through opening of a housing, wherein the sealing system reliably and permanently prevents or minimizes, respectively, the migration of fluid media from the one side of the through opening to the other side of the through opening over great temperature rises and very high temperatures of for example 165° C. or even 170° C., wherein the sealing system in terms of construction is furthermore to be as small as possible so as to be able to provide, for example, a bearing which has comparatively long bearing means (for example rolling elements, for example needles) and is able to be attached in the through opening, or so as to be able to reduce the wall thickness in the region of the through opening, the sealing system in the case of wear on the sealing means of the sealing system furthermore ensuring the sealing function in an ideally automatic (self-adjusting) manner and in a movement (rotation) of the shaft generating as little friction as possible.

This demand can be met by the subject matter of the present disclosure described herein. Advantageous embodiments of the present disclosure are also described herein.

Proposed according to a first aspect of the disclosure is a component assembly for a motor vehicle.

The component assembly has a housing; an actuating element that is rotatable about an axis; an actuator which is specified for causing a rotation of the actuating element; as well as a rotatable shaft which extends along a shaft axis and is disposed between the actuating element and the actuator and which is coupled to the actuating element and the actuator. The shaft is guided through a first through opening in the housing; wherein a sealing system which seals a first end of the first through opening in relation to a second end, facing away from the first end, of the first through opening against liquid media passing through is provided in a radial direction perpendicular to the shaft axis so as to be between the shaft and a first internal wall of the first through opening. The sealing system has a first sealing element having a second through opening through which the shaft is guided; wherein the first sealing element has a radially inward-pointing first internal side as well as a radially outward-pointing first external side; wherein the first sealing element by way of the first internal side in a sealing manner encircles a shaft external side of the shaft. It is provided herein that a first material of the first sealing element largely comprises polytetrafluoroethylene (PTFE).

When PTFE is used, the PTFE may be virgin or compound PTFE.

A particularly low friction between the first sealing element and the shaft is advantageously caused by the use of PTFE. On account thereof, the first sealing element is furthermore advantageously particularly resistant to high temperature differentials as well as to corrosive and/or aggressive media.

Unless otherwise described, in the context of this application the term "having" is used synonymously with the term "comprising".

The radial direction is perpendicular to the direction of the axis, or the shaft axis, respectively. An encircling direction encircles the direction of the axis or the shaft axis, respectively.

The component assembly can be specified for use in a motor vehicle.

The shaft can be fastened indirectly, for example, or directly to the actuating element. The shaft can be connected indirectly, for example, or directly to the actuator.

The actuator can be, for example a motor, for example an electric motor, for example a brushless DC motor.

It can be provided that the first through opening is disposed in a cover of the housing. The sealing system can thus be assembled in a particularly simple manner. The collateral costs are particularly minor in the case of an assembly error. Moreover, in the case of a deteriorating sealing effect the low-cost cover of the housing can be readily replaced conjointly with the sealing system.

The first sealing system can be designed or configured, respectively, as an annular closed doughnut, for example.

The component assembly can have a cap, for example, which at least partially closes the first through opening. On account thereof, the first through opening can already be partially protected against the ingress of dirt and fluid media, for example splashes of liquids. The sealing system is destressed on account thereof. The cap can have a cap through opening, for example, through which the shaft runs. The cap herein can be disposed on a side of the sealing system that is exposed to invading media, for example. The cap can be disposed on and/or on top of and/or in the first through opening.

The cap can be designed from the same material as the housing in the region of the first through opening, for example. It is advantageously prevented on account thereof that leakage paths between the housing and the cap arise as consequence of dissimilar coefficients of expansion during temperature changes. The cap can comprise aluminum or plastics material, for example, or be made of aluminum or plastics material, respectively.

The housing can be designed from a metal, for example (aluminum or steel, for example), or from a plastics material (polyamide, for example).

Such a cap can also be a type of closure cover.

It can be provided that such a cap does not bear on the shaft, or does not contact the shaft, respectively.

In one refinement it is provided that the first sealing element on the first internal side has at least one clearance which extends in particular in a radially outward manner. On account thereof, particularly positive and reliable sealing is advantageously achieved. Two portions which are separated by a clearance and, when viewed along the axial direction, for example, are adjacent to one another and bear on the shaft can thus acts in the manner of seal lips. The friction is advantageously reduced in this way, since the bearing face of the bearing portions is reduced. The flexibility in the axial and radial direction of the portions bearing on the shaft is furthermore advantageously improved on account thereof such that the sealing can act in an overall more reliable manner. Finally, staged sealing which has the effect that dirt or fluid media which has invaded a potential gap between the shaft and the first sealing element can only make its way to the next clearance and is then stopped by the next portion that bears on the shaft and can act in the manner of a seal lip is achieved in this way. A redundancy in terms of the sealing effect is thus achieved by a single component.

In one refinement it can be provided that the first sealing element in a radial section has a U-shaped profile, wherein the open side of the U-shaped profile faces the first end of the first through opening.

A particularly flexible, elastic first sealing element which by way of the portion thereof that points toward the shaft and extends in the axial direction can bear tightly on the shaft is achieved on account thereof. On account of the U-shape, the sealing element is simultaneously configured so as to be particularly stable. The open side that faces the first end enables particularly simple assembling, since it is possible to reach into the open side when assembling takes place from the first end.

Alternatively or additionally, it can be provided that the open side of the U-shaped profile faces the second end of the first through opening.

Deposits of dirt of particles are particularly minimized on account thereof.

If the open side additionally also faces the second end, the first sealing element thus has the shape of an "H", thus the shape of a double T-beam rotated by 90°. On account thereof, a particularly high level of stability of the first sealing element is achieved simultaneously with a minor consumption in terms of material.

Stabilizing the two radial walls of the first sealing element is advantageously caused on account of a second material that is at least in part different from the first material of the first sealing element being disposed in an interior space of the U-shaped profile.

It can be provided, for example, that the second material is specified for receiving particles. It is advantageously caused on account thereof that particles that make their way into the region of the first sealing element are not released again but are bound. On account thereof, these particles are unable to pass the sealing point of the sealing system, or are prevented from invading any further, respectively, when the particles have passed the sealing point and then received only in the second material. In other words, the second material can be specified for filtering particles from the fluid media, or for binding the particles, respectively.

The second material can be a felt, for example. The second material can be configured in the manner of a doughnut. The second material can be press-fitted into the interior of the U-shaped profile and thus be held therein, for example. Felt can advantageously bind particles or dirt, respectively, thereon or therein at different conditions in terms of moisture and temperature.

The first sealing element on the radial external side thereof can have a collar which protrudes beyond a support plane of the first sealing element. The caller herein can be formed by the radial outer wall of the U-shape. The support plane herein can be formed by the radial extending portion of the U-shape. It is advantageously caused on account of this design embodiment that the second material can be placed in the interior space of the U-shape so as to be positionally secure in the radial direction. The second material can bear on the external wall of the U-shape, for example on an internal side of the collar. In this way, the second material can pre-load the first sealing element in the direction toward the shaft such that the sealing effect is ensured. Furthermore advantageously, the pre-loading of the first sealing element is in this way also independent of potential tolerances of the diameter of the first through opening.

It can be provided, for example, that the collar has a height above the support plane that is at least 30% of the thickness of the second material, preferably at least 50% of the thickness of the second material, and particularly preferably at least 75% of the thickness of the second material. The collar can have a height of at least 1 mm or at least 2 mm, for example.

A particularly compact sealing system of simple construction is advantageously provided on account of the first sealing element on the first external side bearing in an encircling tight manner on the first internal wall of the first through opening.

It is advantageously provided that the sealing system has a second sealing element, wherein the second sealing element is disposed on the first external side of the first sealing element, wherein the second sealing element has a radially inward-pointing second internal side as well as a radially outward-pointing second external side, wherein the second sealing element in a completely sealing manner encircles the first sealing element. The second sealing element can be configured so as to be elastically reversible, for example.

On account thereof, a sealing function in the sealing system in relation to the rotating shaft can advantageously be separated from a sealing function in relation to the first internal wall of the first through opening, for example. The materials of the first sealing element and the second sealing element can be different, for example. In this way, the first sealing element in terms of the frictional properties thereof and/or the sealing properties thereof in relation to the rotating shaft can be optimized, for example.

For example, the second sealing element can be configured in the manner of an O-ring. In this instance, the sealing element can advantageously be procured in a very cost-effective manner in different sizes.

The second sealing element can have the third through opening, for example. The first sealing element can be disposed in the third through opening, for example.

The second sealing element in the non-assembled state, for example, can be oversized in the radial direction in relation to the first through opening. When the second sealing element conjointly with the first sealing element is assembled in the first through opening, it is advantageously caused on account thereof that the first sealing element is under pre-loading directed in a radially inward manner toward the shaft. In this way, the sealing in relation to the shaft is advantageously self-adjusting on the shaft even in the event of wear on account of friction. The sealing is thus permanently ensured in a reliable manner.

It is advantageously provided that the second sealing element by way of the second external side bears in an encircling tight manner on the first internal wall of the first through opening. Sealing is also caused on the radial external side of the sealing system on account thereof.

On account of the sealing system being press-fitted into the first through opening, there is the advantageous effect that the assembling of the sealing system is possible in a particularly simple and cost-effective manner. The sealing system can thus be fastened or fixed, respectively, in a force-fitting or friction-fitting manner in the first through opening, for example. The fastening can be caused in the axial direction and/or in the radial direction and/or in the encircling direction.

To this end, a certain oversize in relation to the first internal wall can be provided on the external side on the sealing system in the non-assembled state of the latter in the first through opening, for example. A force-fitting or friction-fitting, respectively, connection between the sealing element support and the first through opening is thus caused when press-fitting in this instance.

If the sealing system has a first sealing element and a second sealing element, the second sealing element can be disposed between the first internal wall of the first through opening and the first external side of the first sealing element, for example. The second sealing element can be compressed there, for example (in particular when viewed along the radial direction).

On account of the first sealing element having a first side that faces the first end of the first through opening as well as a second side that faces the second end of the first through opening, wherein a third sealing element is provided on the second side of the first sealing element in the first through opening, wherein the third sealing element in an encircling manner bears on the shaft, the sealing effect is advantageously further improved. The third sealing element herein can furthermore advantageously be specially adapted to sealing in relation to the ingress of fluid media (for example liquids or gases), since the passage of particles through the first sealing element can be reduced or even precluded. It is advantageously provided that the second sealing element in terms of a direction viewed from a more contaminated side that is exposed to the media is disposed behind the first sealing element (in a manner analogous to that of a fine filter which in a liquids filter is disposed behind a coarse filter).

Alternatively or additionally it is provided that the third sealing element largely (to the extent of more than 50%) comprises PTFE or fluorocarbon (FKM). The third sealing element can be made of PTFE or FKM, for example, or be composed thereof. A particularly positive temperature resistance is advantageously caused on account thereof, for example in terms of the reversible elasticity which causes the sealing effect and in terms of wear. A particularly high level of resistance in terms of decomposition by aggressive media is also advantageously caused on account thereof. Finally, particularly low friction (in relation to the shaft) is advantageously caused on account thereof.

When PTFE is used, the PTFE may be virgin or compound PTFE.

The third sealing element can have a seal lip, for example. This seal lip can bear on the shaft, for example. This seal lip can be configured so as to be elastic, for example.

It is advantageously provided that the third sealing element has an annular outer portion and an annular inner portion, wherein the third sealing element by way of the inner portion bears on the shaft, wherein the inner portion, particularly in the state assembled on the shaft, in relation to the outer portion is angled in the direction of the first sealing element. A certain level of pre-loading of the third sealing element in relation to the shaft can be ensured on account thereof, for example. Should wear arise over time on the inner portion that bears on the shaft, the sealing effect can be maintained in a self-adjusting manner in that the third portion slips downward along the shaft. The service life of the sealing system is advantageously increased on account thereof.

It is understood that the third sealing element in the non-assembled state on the shaft can have the shape of a planar, flat doughnut (like that of a washer).

It can be provided, for example, that the third sealing element is designed in the form of a doughnut which in particular at least in part bears on a shoulder of the first through opening. Particularly reliable assembling, a particularly positive sealing effect, and reliable axial positioning in the first through opening is advantageously caused on account thereof.

It can be furthermore provided, for example, that the first internal side of the second through opening of the first sealing element in an encircling manner is spaced apart from the shaft in an axial portion, wherein the third sealing element by way of the inner portion thereof protrudes into the space which in the radial direction extends between the second through opening and the shaft. A particularly compact and small construction mode of the sealing system along the axial direction is advantageously enabled on account thereof. On account thereof, a bearing having longer support elements (for example needles) can be for example used with an identical axial length of the first through opening, for example when using a bearing for the shaft, this improving the load rating or the load bearing capability, respectively.

In one refinement it is provided that the third sealing element is fastened to the second side of the first sealing element.

On account thereof, the sealing system as a modular unit can be installed in a particularly simple manner, and the risk of any leakage on account of faulty assembling is minimized.

This fastening can be non-releasable, for example, such that it is impossible for the third sealing element to be released in a non-destructive manner from the first sealing element.

Alternatively, it can be provided that the third sealing element is an element which is separate from the first sealing element. In this way, the first sealing element (optionally conjointly with the second sealing element) can be provided as a first unit, and the third sealing element can be provided as a second unit. After assembling the shaft in the first through opening (by pushing the shaft through the latter), the third sealing element can thus advantageously be pushed over the shaft and self-centering can be caused in this way. It is thus ensured that the third sealing element overall bears in a uniformly encircling manner on the shaft. The first sealing element is assembled only thereafter (optionally conjointly with the second sealing element).

Depending on the specific application (for example different application temperatures, different requirements in terms of tightness), different combinations of the first and the third sealing element can furthermore advantageously be provided in a targeted manner. For example, the third sealing element in terms of the material thereof or in terms of the thickness thereof along the axial direction can be specially optimized and separately provided for the respective specific application.

In one refinement it can be provided that the third sealing element on the side thereof that faces the first sealing element is coated or wetted with an elastomer. A particularly positive sealing effect of the third sealing element can advantageously be caused on account thereof. A secondary seeping path for media can be effectively precluded on account of the elastomer. This is because media which penetrate the first sealing element reach the side of the third sealing element that faces the first sealing element. When the media now were unable to move along this surface in a radially outward manner and then flow around the third sealing element, the media would be able to externally bypass the third sealing element. The coating or wetting, respectively, by way of the elastomer effectively seals off this secondary seeping path. To this end, the elastomer for merely further improving the sealing effect, for example, can also be compressed in the axial direction, or firmly pressed onto the third sealing element, respectively, by the first sealing element.

When the first sealing element is pressed along the axial direction against the third sealing element, the elastomer disposed between the third sealing element and the first sealing element can furthermore advantageously deform and be displaced in the radial direction. The third sealing element connected to the elastomer follows this movement and in this way is automatically also pushed radially inward in the direction of the shaft and thus (further) pre-loaded. The sealing effect is further improved on account thereof.

The material of the elastomer can be different from the material of the third sealing element, for example. The elastomer can have or comprise, respectively, merely for example natural rubber, rubber, ethylene-propylene-diene-monomer rubber (EPDM) or silicone, or largely (to the extent of more than 50%) comprise or be composed of one of these materials. It is understood that other materials can also be selected for the elastomer, depending on the application conditions.

In one refinement it is provided that a bearing which mounts the shaft is disposed in a portion in the first through opening that faces the second side of the first sealing element. On account thereof, the shaft can advantageously be moved in a particularly low-friction manner in the first through opening.

The bearing can be a rolling bearing, a needle bearing, a sintered bearing, a ball bearing, or a friction bearing, for example.

BRIEF DESCRIPTION OF THE DRAWINGS

Further features and advantages of the present disclosure will become obvious to the person skilled in the art from the description hereunder of exemplary embodiments with reference to the appended drawings, the exemplary embodiments however are not to be interpreted as limiting the disclosure. In the drawings:

FIG. 1b shows a perspective schematic view of the sealing system from the component assembly from FIG. 1a;

FIG. 2b shows a perspective schematic view of the sealing system from the component assembly from FIG. 2a; and FIG. 3 shows a schematic cross section through a further embodiment of a component assembly.

DETAILED DESCRIPTION

Figure 1A:
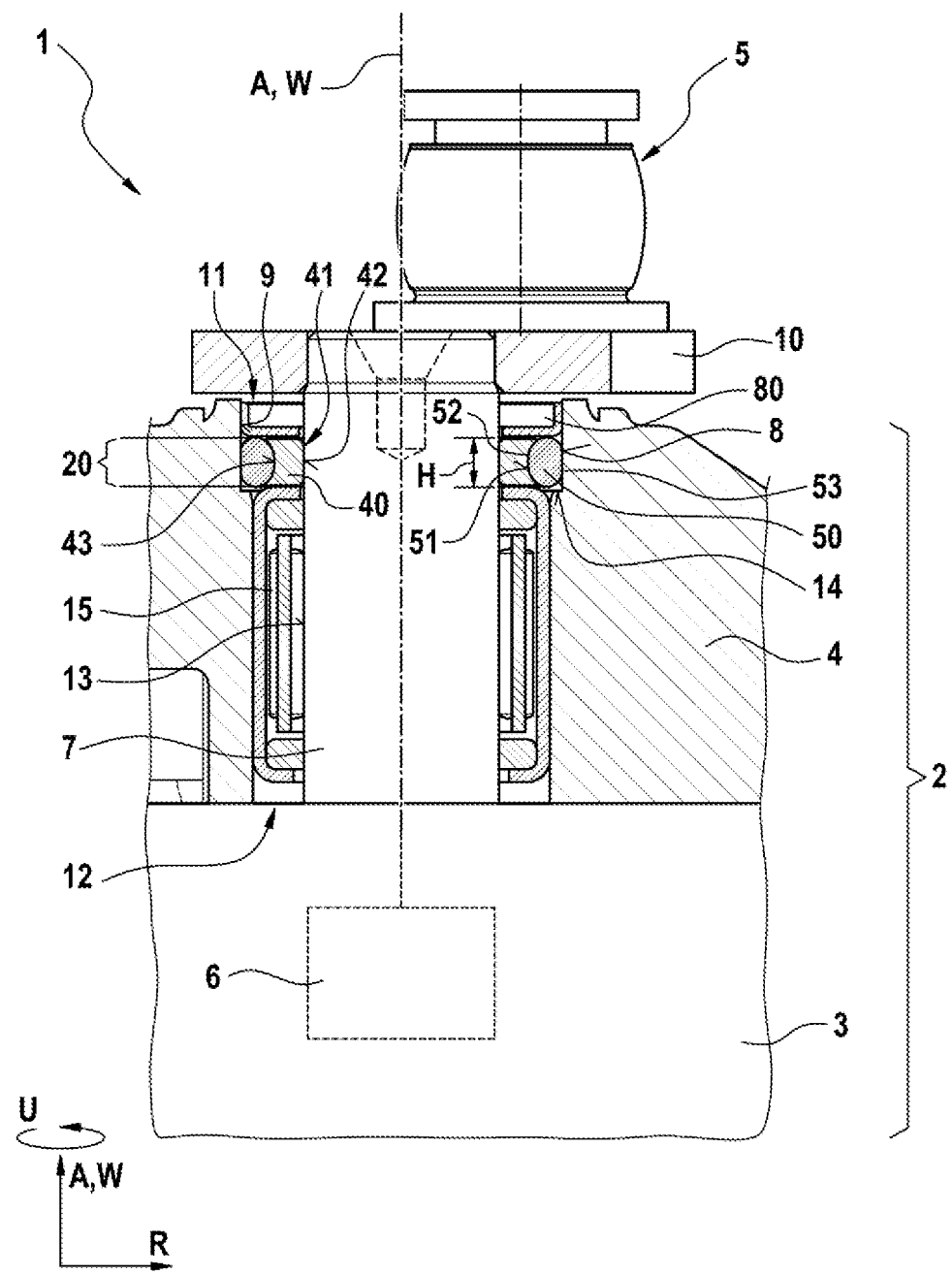
FIG. 1a shows schematic cross section through a component assembly.

FIG. 1 shows a schematic cross-section through a component assembly 1. This component assembly 1 can be a throttle flap system or a general-purpose actuator, for example.

The component assembly 1 may be suitable for installation in a motor vehicle. The component assembly 1 can however also be specified for use or installation, respectively, in a motor vehicle.

The component assembly has a housing 2 (in part schematically illustrated in the form of a block) which here has a housing cup 3 and a cover 4. The component assembly 1 furthermore has an actuating element 5 that is rotatable about an axis A, furthermore an actuator 6 (illustrated merely as a block) which is specified for causing a rotation of the actuating element 5, and a rotatable shaft 7 which extends along a shaft axis W and is disposed between the actuating element 5 and the actuator 6 and which is coupled to the actuating element 5 and the actuator 6.

The shaft 7 is guided through a first through opening 8 in the housing 2, wherein a sealing system 20 which seals a first end 11 of the first through opening 8 in relation to a second end 12, facing away from the first end 11, of the first through opening 8 against liquid media passing through is provided in a radial direction R perpendicular to the shaft axis W so as to be between the shaft 7 and a first internal wall 9 of the first through opening 8. The sealing system 20 has a first sealing element 40 having a second through opening 41 through which the shaft 7 is guided. The first sealing element 40 has a radially-inward pointing first internal side 42 as well as a radially outward-pointing first external side 43, wherein the first sealing element 40 by way of the first internal side 42 in a sealing manner encircles a shaft external side 13 of the shaft 7. A first material M1 of the first sealing element 40 largely comprises polytetrafluoroethylene (PTFE).

In other words, the first sealing element 40 is made largely (to the extent of more than 50%) of PTFE, or largely comprises PTFE. This herein can be virgin or compound PTFE.

The sealing element 40 is particularly advantageously resistant in relation to temperatures in the range from −40° C. to 160° C., or even −50° C. to 170° C.

In the exemplary embodiment illustrated here, the entry of media in relation to which the sealing system 20 is to be effective takes place from the first end 11 of the first through opening 8.

The sealing system 20 here, in a merely exemplary manner, has a second sealing element 50 having a third through opening 51. The second sealing element 50 in an exemplary manner here is disposed on the first external side 43 of the first sealing element 40. In other words, the first sealing element 40 is disposed in the third through opening 51 of the second sealing element 50.

The second sealing element 50 has a radially inward-pointing second internal side 52 as well as a radially outward-pointing second external side 53, wherein the second sealing element 50 in a completely sealing manner encircles the first sealing element 40. The second sealing element 50 can be configured so as to be elastically reversible, for example. The second sealing element 50 can be configured as an O-ring, for example.

The second sealing element 50 here, by way of the second external side 53, bears in an encircling tight manner on the first internal wall 9 of the first through opening 8. The second sealing element 50 thus forms the type of external seal of the sealing system 20.

The first sealing element 40 here, in a merely exemplary manner, is press-fitted into the first through opening 8. The first sealing element 40 here, when viewed in the radial direction R, is press-fitted between the second sealing element 50 and the shaft 7. The first sealing element 40 is held in a force-fitting or friction-fitting manner, for example. In principle, the first sealing element 40 as the sole sealing element or conjointly with the second sealing element 50 could also be fastened in a materially integral manner, for example adhesively bonded or welded, in the first through opening 8. However, other fastening possibilities, for example a screw-fitting, are also conceivable.

In this exemplary embodiment the through opening 8 at the first end 11 thereof has a cap 80. The cap 80 can already keep away a large part of dirt, contamination and fluid media, for example spray water, from the first through opening 8. The cap 80 acts at least as an impulse breaker which minimizes kinetic energy of a jet of spray water that impacts the first through opening 8, for example, and thus destresses the sealing system 20. The cap 80 here is press-fitted into the first through opening 8. To this end, the cap 80 in the non-assembled state can be oversized in relation to the diameter of the first through opening 8. The cap 80 has a cap through opening 81, wherein the cap 80 here does not have to bear on the shaft 7, or does not bear on the latter, respectively. The cap 80 can be designed from the same material as the housing 2 in the region of the first through opening 8, for example. The first through opening 8 here is disposed in the cover 4.

However, it is also possible for different materials to be used. In this instance, the coefficients of thermal expansion of the two materials are advantageously very similar across the range of the operating temperatures so as to minimize thermal stresses and leakage paths.

A bearing 15 which mounts the shaft 7 is furthermore disposed in the first through opening 8 so as to be between the second end 12 of the first through opening 8 and the sealing system 20, when viewed in the axial direction. The bearing 15 can be configured as a rolling bearing, a needle bearing, a ball bearing, a sintered bearing, or a friction bearing, for example.

The component assembly can be assembled in the following steps, for example (method for producing a component assembly): first, the housing 2 (here: the cover 4 of the housing 2) having a first through opening 8, as well as a shaft 7, and a sealing system 20 is provided. The sealing system 20 can comprise a first sealing element 40, for example, as well as optionally a second sealing element 50 and/or potentially a third sealing element 60, see FIG. 3. A bearing 15 is furthermore optionally provided. The actuator 6 (for example an electric motor) and the actuating element 5 can furthermore be provided.

If a bearing 15 has been provided, the bearing 15 in a first step is assembled, for example press-fitted, in the first through opening 8. In a further step, the shaft 7 is guided through the first through opening 8. In a further step, the third sealing element 60 can be assembled (see FIG. 3) in that the latter by way of the fourth through opening 64 thereof is push-fitted over the shaft 7, for example. In a further step, the first sealing element 40, optionally conjointly with the second sealing element 50 preassembled thereon, is assembled in, for example press-fitted into, the through opening 8. The first sealing element 40 herein can be press-fitted onto the third sealing element 60 in the axial direction. Finally, the actuator 6 and the actuating element 5 can be coupled to the shaft 7.

Figure 1B:
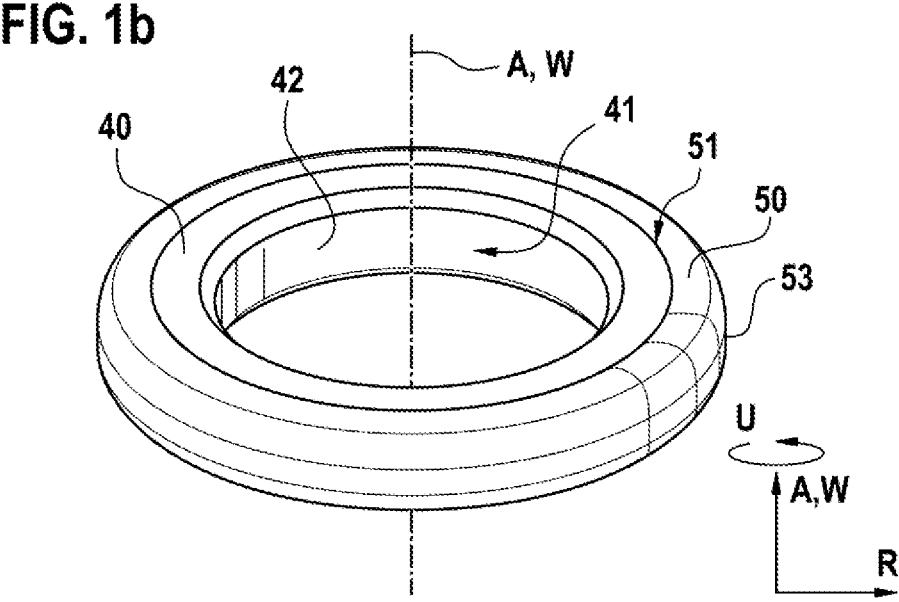

FIG. 1b shows a perspective schematic view of the sealing system 20 from the component assembly from FIG. 1a. It can be readily seen that the first sealing element 40 and the second sealing element 50 are of different designs. On account thereof, the first sealing element 40 can be optimized with a view to sealing and low friction in relation to the shaft 7. The second sealing element 50 can be conceived for pre-loading in a radially inward manner and be designed as a cost-effective standard component, here as an O-ring, for example.

Figure 1C:
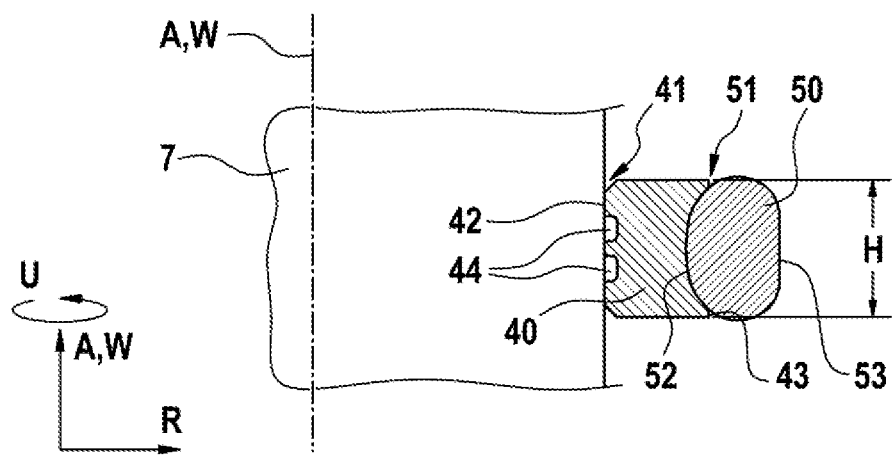
FIG. 1c shows a schematic cross section through a further design embodiment of the sealing system.

FIG. 1c shows a schematic cross-section through a further design embodiment of the sealing system 20. The first sealing element 40 on the first internal side 42 here has two clearances 44 which in particular extends in a radially outward manner. On account of the clearances 44, the portions of the first internal side 42 that bear on the shaft 7 and are adjacent to the clearances 44 are designed in the manner of seal lips. On account thereof, the portions have more flexibility in the axial direction and also in the radial direction R (for example in relation to tolerances of the shaft diameter or to tilting of the shaft 7) such that the sealing effect is improved.

Figure 2A:
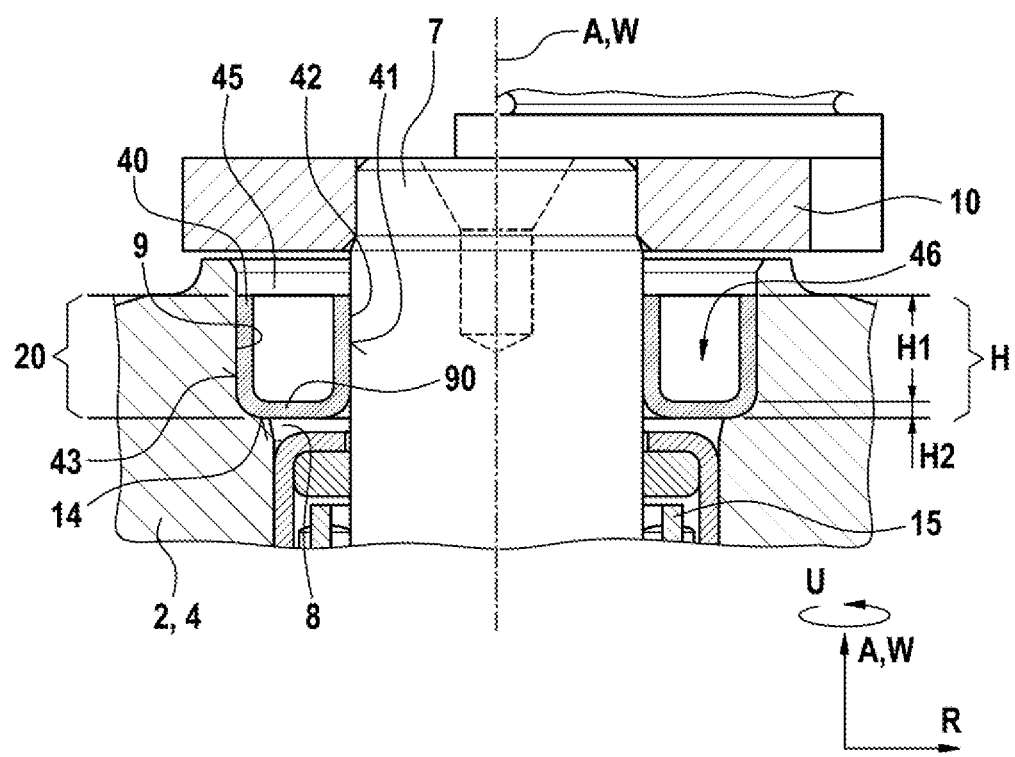
FIG. 2a shows a schematic cross section through a further component assembly.

FIG. 2a shows a schematic cross-section through a further component assembly 1. The sealing system 20 here is solely configured by the first sealing element 40. The first sealing element 40 here, in merely exemplary manner, in a radial section has a U-shaped profile wherein the open side of the U-shaped profile faces the first end 11 of the first through opening 8. The first sealing element 40 by way of the first external side 43 thereof in an encircling tight manner bears on the first internal wall 9 of the first through opening 8.

The U-shaped profile by way of the radially outer first external side 43 and the radially inner first internal side 42 raises above a base 90 which also forms a type of support plane. The first internal side 42 and the first external side 43 in relation to the base 90, or the support plane, respectively, are in each case configured as a type of collar 49. The first internal side 42 and first external side 43 form the seal in relation to the shaft 7 and the first internal wall 9. The base 90 has a first height H1. The two collars 49 here each rise above the base 90 by way of a height H2 of the collar 49. The overall height H along the axial direction of the first sealing element 40 is derived from the height H1 of the base 90 and from the height H2 of the collar 49. The height H1 of the base 90 can be least 0.5 mm, for example, preferably at least 1 mm. The height H2 of the collar 49 can be at least 1 mm, for example, preferably at least 2 mm.

The first sealing element 40 in non-assembled state in the first through opening 8 can have a certain oversize in relation to the diameter of the first through opening 8. The first sealing element 40 in this instance can be installed, for example press-fitted, in a force-fitting a friction-fitting manner in the first through opening 8.

An interior space 46 of the U-shaped profile here is empty.

Figure 2B:
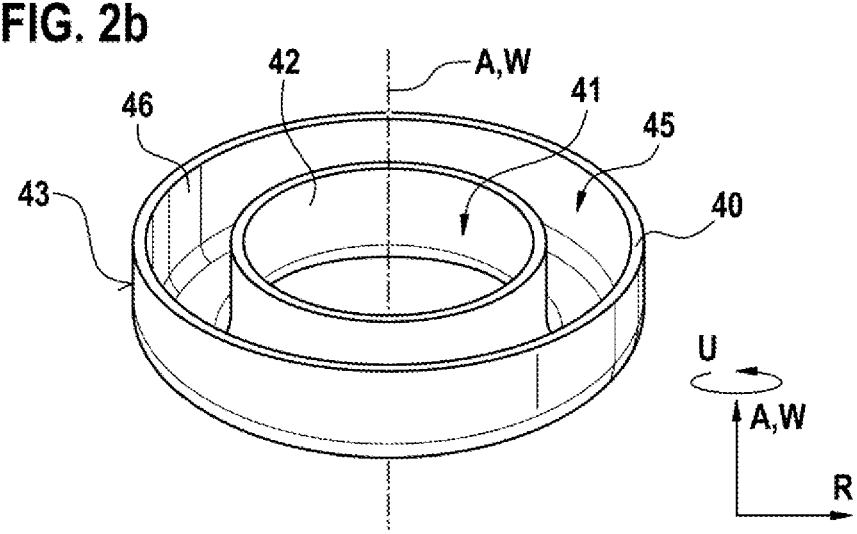

FIG. 2b shows a perspective schematic view of the sealing system from the component assembly 1 from FIG. 2a. The U-shaped profile having the open side 45 thereof and the interior space 46 thereof can be readily seen.

FIG. 3 shows a schematic cross-section through a further embodiment of a component assembly 1. The first sealing element 40 herein, as in FIGS. 2a and 2b, is designed having a U-shaped profile. A second material M2 which is at least in part different from the first material M1 of the first sealing element is disposed in the interior space 46 of the U-shaped profile. The second material M2 in merely exemplary manner can be specified for receiving particles. The second material M2 can be designed from felt, for example. The felt can be produced from natural fibers or from plastics-material fibers. Other materials are however also conceivable. The second material M2 here does not bear on the shaft 7.

In principle it is also conceivable for the first sealing element 40 having a U-shaped profile on the first external side 43 thereof also to be surrounded by a second sealing element 50 (as in FIGS. 1a to 1c).

In one variant which is not illustrated here the first sealing element 40 can have an L-shaped profile. In this case, only the first internal side 42 of the base 90 bears on the shaft 7. In this case, the radially inner collar 49 would have to be considered as being omitted in comparison to the illustration of FIG. 3. The second external side 43 in a sealing manner can bear directly on the internal wall 9 or be surrounded by a second sealing element 50.

In an L-shaped profile of this type it is possible for a second material M2 to be disposed in the interior space 46 between the radially outer collar 49 and the shaft 7. In this case, the second material M2, for example a felt, can bear directly on the shaft 7 and thus be a type of preliminary filter or preliminary seal, respectively, for sealing the first sealing element 40 in relation to the shaft 7. The second material M2 in such a case can represent a type of additional sealing element.

In the exemplary embodiment illustrated in FIG. 3, a third sealing element 60 is provided in the first through opening 8 on the second side 48 of the first sealing element 40. The third sealing element 60 here in an encircling manner bears on the shaft 7.

The third sealing element 60 has an elastic seal lip. This seal lip is at most 1 mm thick, when viewed along the axial direction, for example. On account thereof, the seal lip is particularly flexible.

The third sealing element 60 here, in a merely exemplary manner, is made largely, to an extent of more than 50%, of PTFE or fluorocarbon (FKM). On account thereof, the third sealing element 60 is particularly stable in relation to high and low temperatures and in relation to chemical changes on account of aggressive media. However, the use of other materials is also possible, depending on the intended use and the application conditions.

The third sealing element 60 here is designed in the form of a doughnut. The doughnut at least in part bears on the shoulder 14 of the first through opening 8. The doughnut in this portion, when viewed along the axial direction, is disposed between the sealing element support 30 and the shoulder 14. The third sealing element 60 has a fourth through opening 64 through which the shaft 7 protrudes in the assembled state.

The third sealing element 60 here, in a merely exemplary manner, has an annular outer portion 61 and an annular inner portion 62. The third sealing element 60 by way of the inner portion 62 bears on the shaft 7. The inner portion 62 here, in a merely exemplary manner, in relation to the outer portion 61 is angled in the direction of the first sealing element 40 (in the assembled state). It is understood that the third sealing element 60 in the non-assembled state on the shaft 7 can be a planar doughnut (in the manner of a washer).

In the embodiment illustrated here, the third sealing element 60 is an element which is separate from the sealing element 40 and able to be tailored to the respective specific application.

The third sealing element 60 in encircling manner bears on the shaft 7 and at the radially outer periphery of the third sealing element 60 does not abut the first internal wall 9 of the first through opening 8. Rather, a void 65 is situated there. In this way, the third sealing element 60 is self-centering when assembled on the shaft 7. An external diameter of the third sealing element 60 in this exemplary embodiment is thus smaller than an internal diameter of the first through opening 8 in that portion where the third sealing element 60 is assembled.

Alternatively, the third sealing element 60 in an embodiment not illustrated here can be fastened to the second side 48 of the first sealing element 40. For example, a non-releasable fastening, for example by adhesive bonding or welding, can be present here. The first sealing element 40 conjointly with the third sealing element 60 (and optionally also the second sealing element 50) can thus be made and installed as a modular unit.

The first internal side 42 of the second through opening 41 of the first sealing element 40, in a lower axial portion that faces a second end 12 here, in an encircling manner is spaced apart from the shaft 7 by a spacing B. The spacing B can be 0.05 mm to 2 mm, for example, preferably 0.1 mm to 1 mm. The first sealing element 40 thus bears on the shaft 7 by way of only part of the base 90.

The third sealing element 60 by way of the inner portion 62 thereof protrudes into the space which in the radial direction R extends between the second through opening 41 in the region of the lower portion and the shaft 7. For example, the inner portion 62 can protrude into the space by at least 0.5 mm, preferably at least 1 mm. On account thereof, a sealing system 20 which is of a particularly compact and small construction in the axial direction is achieved.

It can be readily seen in FIG. 3 that the second sealing element 60 on the side thereof that faces the first sealing element 40 is coated are wetted with an elastomer 63. The elastomer 63 can comprise, for example, natural rubber, rubber, ethylene-propylene-diene-monomer rubber (EPDM) or silicone, or largely (to the extent of more than 50%) comprise or be composed of one of these materials. However, other materials for the elastomer 63 are also conceivable.

The elastomer 63 helps in sealing off a secondary path for fluid media. For example, this secondary path can run between the first sealing element 40 and the third sealing element 60, around the third sealing element 60, and then downward through the first through opening 8 in the figure.

The sealing effect in relation to this secondary path is further increased when the first sealing element 40 in the figure is pressed with a force F from above along the axial direction onto the second sealing element 50 (see the downward-pointing arrow). The elastomer 63 is in this instance compressed and seals off a secondary path in a particularly effective manner.

The material of the elastomer 63 here is different from the material of the third sealing element 60.

The elastomer 63 here is non-releasably connected to the third sealing element 60.

It can be readily seen that, when viewed in the radial direction R, the void 65 is situated between the first internal wall 9 and an outer periphery of the third sealing element 60. The first sealing element 40 in the region of the base 90, at least on the second side 48, by way of the spacing B is furthermore spaced apart from the shaft 7.

The component assembly can be, for example, an electric general-purpose actuator or a throttle flap or an exhaust-gas return valve or a wastegate for a turbo charger, without being limited to these embodiments.

What is claimed is:

1. A component assembly for a motor vehicle, comprising:
    a housing;
    an actuating element that is rotatable about an axis;
    an actuator which is configured to cause rotation of the actuating element;
    a rotatable shaft which extends along a shaft axis and is disposed between the actuating element and the actuator and which is coupled to the actuating element and the actuator, the shaft also extending through a first through opening in the housing; and
    a sealing system configured and arranged to seal a first end of the first through opening in relation to a second end, facing away from the first end, of the first through opening against liquid media passing through, the sealing system being arranged in a radial direction that is perpendicular to the shaft axis so as to be located between the shaft and a first internal wall of the first through opening,
    wherein the sealing system has a first sealing element having a second through opening through which the shaft extends,
    wherein the first sealing element has a radially inward-pointing first internal side as well as a radially outward-pointing first external side,
    wherein the first sealing element by way of the first internal side in a sealing manner encircles a shaft external side of the shaft,
    wherein a first material of the first sealing element comprises polytetrafluoroethylene (PTFE), and
    wherein the first sealing element on the first external side bears in an encircling tight manner on the first internal wall of the first through opening.

2. The component assembly according to the claim 1 wherein the first sealing element on the first internal side has at least one clearance which extends in a radially outward manner.

3. The component assembly according to claim 1, wherein:
    the first sealing element in a radial section has a U-shaped profile, and
    an open side of the U-shaped profile faces the first end of the first through opening, or the open side of the U-shaped profile faces the second end of the first through opening.

4. The component assembly according to claim 1, wherein:
    the first sealing element in a radial section has a U-shaped profile, and
    a second material that is at least in part different from the first material of the first sealing element is disposed in an interior space of the U-shaped profile.

5. The component assembly according to claim 4, wherein:
    the second material is configured to receive particles.

6. The component assembly according to claim 1, wherein the sealing system is press-fitted into the first through opening.

7. The component assembly according to claim 1, wherein:
    the first sealing element has a first side that faces the first end of the first through opening as well as a second side that faces the second end of the first through opening,
    a third sealing element is provided on the second side of the first sealing element in the first through opening, and
    the third sealing element in an encircling manner bears on the shaft.

8. The component assembly according to claim 7, wherein:
    the third sealing element has an annular outer portion and an annular inner portion,
    the third sealing element by way of the inner portion bears on the shaft, and
    the inner portion in relation to the outer portion is angled in the direction of the first sealing element.

9. The component assembly according to claim 7, wherein the third sealing element is non-releasably fastened to the second side of the first sealing element.

10. The component assembly according to claim 7, wherein:
    the third sealing element on the side thereof that faces the second side of the first sealing element is coated or wetted with an elastomer, and
    the material of the elastomer is different from the material of the third sealing element.

11. The component assembly according to claim 7, wherein the third sealing element is an element which is separate from the first sealing element.

12. The component assembly according to claim 1, further comprising a bearing configured to mount the shaft, wherein:
the bearing is disposed in a portion of the first through opening that faces the second side of the first sealing element, and
the bearing is a rolling bearing, a needle bearing, a ball bearing, a sintered bearing, or a friction bearing.

13. The component assembly according to claim 1, wherein:
the first sealing element in a radial section has a U-shaped profile, and
the open side of the U-shaped profile faces the second end of the first through opening.

14. A component assembly for a motor vehicle, comprising:
a housing;
an actuating element that is rotatable about an axis;
an actuator which is configured to cause rotation of the actuating element;
a rotatable shaft which extends along a shaft axis and is disposed between the actuating element and the actuator and which is coupled to the actuating element and the actuator, the shaft also extending through a first through opening in the housing; and
a sealing system configured and arranged to seal a first end of the first through opening in relation to a second end, facing away from the first end, of the first through opening against liquid media passing through, the sealing system being arranged in a radial direction that is perpendicular to the shaft axis so as to be located between the shaft and a first internal wall of the first through opening,
wherein the sealing system has a first sealing element having a second through opening through which the shaft extends,
wherein the first sealing element has a radially inward-pointing first internal side as well as a radially outward-pointing first external side,
wherein the first sealing element by way of the first internal side in a sealing manner encircles a shaft external side of the shaft,
wherein a first material of the first sealing element comprises polytetrafluoroethylene (PTFE),
wherein the first sealing element in a radial section has a U-shaped profile, and
wherein a second material that is at least in part different from the first material of the first sealing element is disposed in an interior space of the U-shaped profile.

15. The component assembly of claim 14, wherein the second material is configured to receive particles.

16. The component assembly of claim 15, wherein the second material is a felt.

17. A component assembly for a motor vehicle, comprising:
a housing;
an actuating element that is rotatable about an axis;
an actuator which is configured to cause rotation of the actuating element;
a rotatable shaft which extends along a shaft axis and is disposed between the actuating element and the actuator and which is coupled to the actuating element and the actuator, the shaft also extending through a first through opening in the housing; and
a sealing system configured and arranged to seal a first end of the first through opening in relation to a second end, facing away from the first end, of the first through opening against liquid media passing through, the sealing system being arranged in a radial direction that is perpendicular to the shaft axis so as to be located between the shaft and a first internal wall of the first through opening,
wherein
the sealing system has a first sealing element having a second through opening through which the shaft extends,
the first sealing element has a radially inward-pointing first internal side as well as a radially outward-pointing first external side,
the first sealing element by way of the first internal side in a sealing manner encircles a shaft external side of the shaft,
a first material of the first internal side comprises polytetrafluoroethylene (PTFE),
the sealing system has a second sealing element,
the second sealing element is disposed on the first external side of the first sealing element,
the second sealing element has a radially inward-pointing second internal side as well as a radially outward-pointing second external side, and
the second sealing element in a completely sealing manner encircles the first sealing element.

18. The component assembly according to claim 17, wherein the second sealing element is configured so as to be elastically reversible.

19. The component assembly according to claim 18, wherein:
the second material is a felt.

20. The component assembly according to claim 17, wherein the second sealing element by way of the second external side bears in an encircling tight manner on the first internal wall of the first through opening.

21. The component assembly according to the claim 17 wherein the first sealing element on the first internal side has at least one clearance which extends in a radially outward manner.

22. The component assembly according to claim 17, further comprising a bearing configured to mount the shaft, wherein:
the bearing is disposed in a portion of the first through opening that faces the second side of the first sealing element, and
the bearing is a rolling bearing, a needle bearing, a ball bearing, a sintered bearing, or a friction bearing.

* * * * *